US012681489B2

(12) United States Patent
Verma et al.

(10) Patent No.: US 12,681,489 B2
(45) Date of Patent: Jul. 14, 2026

(54) METHOD AND SYSTEM FOR LOCALIZING A MOBILE ROBOT

(71) Applicant: Agency for Science, Technology and Research, Singapore (SG)

(72) Inventors: Saurab Verma, Singapore (SG); Syed Zeezhan Ahmed Mukhtar, Singapore (SG); Kun Zhang, Singapore (SG); Nicolas Andre Gauthier, Singapore (SG); Kam Pheng Ng, Singapore (SG); Yuda Chen, Singapore (SG); Chong Boon Tan, Singapore (SG); Albertus Hendrawan Adiwahono, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 204 days.

(21) Appl. No.: 18/279,922

(22) PCT Filed: Mar. 2, 2022

(86) PCT No.: PCT/SG2022/050108
§ 371 (c)(1),
(2) Date: Sep. 1, 2023

(87) PCT Pub. No.: WO2022/186777
PCT Pub. Date: Sep. 9, 2022

(65) Prior Publication Data
US 2024/0160222 A1      May 16, 2024

(30) Foreign Application Priority Data
Mar. 3, 2021      (SG) ............................ 10202102151V

(51) Int. Cl.
*G05D 1/246* (2024.01)
*G01S 17/89* (2020.01)
(Continued)

(52) U.S. Cl.
CPC .............. *G05D 1/246* (2024.01); *G01S 17/89* (2013.01); *G06T 7/579* (2017.01); *G06T 7/70* (2017.01);
(Continued)

(58) Field of Classification Search
CPC .............. G05D 1/246; G05D 2105/87; G05D 2111/17; G05D 2111/65; G01S 17/89;
(Continued)

(56) References Cited

U.S. PATENT DOCUMENTS 10,970,518 B1 *  4/2021  Zhou ........................ G06T 9/002
11,187,793 B1 *  11/2021  Liu ....................... G05D 1/0214
(Continued)

FOREIGN PATENT DOCUMENTS

| CN | 108253958 A | 7/2018 |
| CN | 111708047 A | 9/2020 |
| WO | WO-2020/154966 A1 | 8/2020 |

OTHER PUBLICATIONS

International Search Report and Written Opinion issued in PCT/SG2022/050108, mailed Apr. 7, 2022; ISA/SG.
(Continued)

*Primary Examiner* — Hunter B Lonsberry
*Assistant Examiner* — Harrison Heflin
(74) *Attorney, Agent, or Firm* — Harness, Dickey & Pierce, P.L.C.

(57) ABSTRACT

A method and system of localizing a mobile robot with respect to a target object using an initial map of a reference object which is a representation of the target object are disclosed. In a specific embodiment, the method comprises obtaining LiDAR data including respective point cloud representations of the target object and the environment in various sampling instances; iteratively updating pose data representing estimated pose of the mobile robot; extracting
(Continued)

a subset of LiDAR data points in the point cloud representation of a previous sampling instance that correspond to features of the target object; obtaining desired LiDAR data points in the point cloud representation in a current sampling instance, and determining a localization pose of the mobile robot with respect to the target object in the current sampling instance based on the desired LiDAR data points.

15 Claims, 6 Drawing Sheets

(51) Int. Cl.

| | | |
|---|---|---|
| *G05D 105/80* | (2024.01) | |
| *G05D 111/10* | (2024.01) | |
| *G05D 111/63* | (2024.01) | |
| *G06T 7/579* | (2017.01) | |
| *G06T 7/70* | (2017.01) | |

(52) U.S. Cl.
CPC ...... *G05D 2105/87* (2024.01); *G05D 2111/17* (2024.01); *G05D 2111/65* (2024.01); *G06T 2207/10028* (2013.01)

(58) Field of Classification Search
CPC .. G06T 7/579; G06T 7/70; G06T 2207/10028
See application file for complete search history.

(56) References Cited

U.S. PATENT DOCUMENTS

| | | | | |
|---|---|---|---|---|
| 2017/0371348 | A1* | 12/2017 | Mou | ..................... G05D 1/0257 |
| 2019/0035099 | A1* | 1/2019 | Ebrahimi Afrouzi | ... G06T 7/344 |
| 2020/0377105 | A1* | 12/2020 | Murashkin | ............ B60W 40/04 |
| 2021/0278851 | A1* | 9/2021 | Van der Merwe | ... G06V 10/764 |
| 2023/0161356 | A1* | 5/2023 | Eoh | ........................ G05D 1/247 |
| | | | | 701/25 |
| 2023/0314568 | A1* | 10/2023 | Kong | ..................... G06V 20/58 |
| | | | | 702/159 |
| 2024/0017747 | A1* | 1/2024 | Hasenklever | ... B60W 60/00274 |

OTHER PUBLICATIONS

Search Report and Written Opinion for Singapore Patent Application No. 11202306459Q issued May 23, 2025, with correspondence from Marks & Clerk Singapore LLP; 11 pages.

* cited by examiner

METHOD AND SYSTEM FOR LOCALIZING A MOBILE ROBOT

CROSS-REFERENCE TO RELATED APPLICATIONS

This application is a 371 U.S. National Phase of International Application No. PCT/SG2022/050108, filed Mar. 2, 2022, which claims priority to Singapore Application No. 10202102151V, filed Mar. 3, 2021. The entire disclosures of the above applications are incorporated herein by reference.

FIELD AND BACKGROUND

The invention relates to a method and system for localizing a mobile robot, more particularly, but not exclusively, with respect to large objects such as aircraft.

Localization is necessary for the efficient navigation of mobile robots in various environments. Traditionally, this has been achieved by localizing the mobile robot with respect to its surroundings. With increasing demand for robot deployment, however, a new sector has emerged related to performing maintenance services of objects and structures, such as buildings, vehicles, etc. In this application scope, the robot needs to localize itself robustly and accurately with respect to the objects on which the services are to be performed, prior to providing the necessary services, in a process called object-based localization (OBL).

In one existing approach to OBL, a robot roughly localizes with respect to an object by locating so-called "good features" of the object. For example, for an airplane, these "good features" may be the airplane windows. Since feature extraction is computationally expensive, in these approaches the robot typically computes its pose only once and afterward it extrapolates future poses without any correction via sensor feedback. Further, such unique features are only perceivable from restricted positions around the object. Therefore, such techniques may be susceptible to poor localization accuracy since they are heavily dependent on correct detection of specific features.

In an alternative approach, an object is directly detected in the sensor data using machine-learning techniques. This approach, however, typically requires the whole object to be visible in one sensor output data, which might not be possible especially if the object is relatively large. Additionally, such approaches restrict the possibility of rapid deployment of the robot for objects of varied shapes/sizes due to the expensive re-learning of the specific object's characteristics which may be required.

It is desirable to provide a method and system for localizing a mobile robot which addresses at least one of the drawbacks of the prior art and/or to provide the public with a useful choice.

SUMMARY

In a first aspect, there is provided a method of localizing a mobile robot with respect to a target object using an initial map of a reference object which is a representation of the target object. The method comprises: obtaining LiDAR data of the target object captured by a LiDAR device of the mobile robot as the mobile robot traverses in an environment associated with the target object, the LiDAR data including respective point cloud representations of the target object and the environment in various sampling instances; iteratively updating pose data representing estimated pose of the mobile robot with respect to a known reference location in corresponding sampling instances as the mobile robot traverses the environment; extracting a subset of LiDAR data points in the point cloud representation of a previous sampling instance, the subset of LiDAR data points corresponding to features of the target object in the initial map based on the estimated pose of the mobile robot associated with the previous sampling instance; obtaining desired LiDAR data points in the point cloud representation in a current sampling instance, the desired LiDAR data points including current LiDAR data points which correspond to the extracted subset of LiDAR data points in the previous sampling instance; and determining a localization pose of the mobile robot with respect to the target object in the current sampling instance based on the desired LiDAR data points.

By extracting a subset of LiDAR data points in the point cloud representation of a previous sampling instance, the subset of LiDAR data points corresponding to features of the target object in the initial map based on the estimated pose of the mobile robot associated with the previous sampling instance and obtaining desired LiDAR data points in the point cloud representation in a current sampling instance, the desired LiDAR data points including current LiDAR data points which correspond to the extracted subset of LiDAR data points in the previous sampling instance, improved accuracy of object-based localization may be achieved as LiDAR data points which do not relate to the target object and are therefore less useful for object-based localization may be discarded.

Preferably, the step of obtaining desired LiDAR data points in the point cloud representation in a current sampling instance, the desired LiDAR data points including current LiDAR data points which correspond to the extracted subset of LiDAR data points in the previous sampling instance, further comprises the steps of: generating an improved map having a higher density of information than the initial map; determining correspondence between the desired LiDAR data points and the improved map of the reference object to produce a confidence value of each correspondence; and obtaining the LiDAR localization pose based on the confidence values. By generating an improved map having a higher density of information than the initial map, high localization accuracy may be maintained even in the event that very few of the LiDAR data points correspond to the target object.

In a specific embodiment, the pose data representing estimated pose of the mobile robot is updated based on the confidence values. Advantageously, updating the pose data includes using odometry data of the mobile robot.

Preferably, obtaining the desired LiDAR points further comprises filtering the current LiDAR data points based on respective distances of the LiDAR device to the current LiDAR data points; the desired LiDAR data points further including the distance-filtered LiDAR data points.

Advantageously, the following steps are also repeated in the next sampling instance: iteratively updating pose data representing estimated pose of the mobile robot with respect to a known reference location in corresponding sampling instances as the mobile robot traverses the environment; extracting a subset of LiDAR data points in the point cloud representation of a previous sampling instance, the subset of LiDAR data points corresponding to features of the target object in the initial map based on the estimated pose of the mobile robot associated with the previous sampling instance; obtaining desired LiDAR data points in the point cloud representation in a current sampling instance, the desired LiDAR data points including current LiDAR data points which correspond to the extracted subset of LiDAR data points in the previous sampling instance; and determining a localization pose of the mobile robot with respect to the target object in the current sampling instance based on the desired LiDAR data points.

It is envisaged that the reference object for generating the initial map may not be exactly the same as the target object.

In a specific embodiment, the method further comprises defining identifiable reference points on the target object and in the initial map, and generating reference markers using a laser pointer for determining the localization pose of the mobile robot.

In a second aspect, there is provided a system for localizing a mobile robot with respect to a target object using an initial map of a reference object which is a representation of the target object. The system comprises a LiDAR device mounted to the mobile robot and arranged to capture LiDAR data of the target object when the mobile robot is arranged to traverse in an environment associated with the target object, the LiDAR data including respective point cloud representations of the target object and the environment in various sampling instances. The system further includes a pose data update module arranged to iteratively update pose data representing estimated pose of the mobile robot with respect to a known reference location in corresponding sampling instances when the mobile robot is arranged to traverse the environment; and a processor configured to: extract a subset of LiDAR data points in the point cloud representation of a previous sampling instance, the subset of LiDAR data points corresponding to features of the target object in the initial map based on the estimated pose of the mobile robot associated with the previous sampling instance; obtain desired LiDAR data points in the point cloud representation in a current sampling instance, the desired LiDAR data points including current LiDAR data points which correspond to the extracted subset of LiDAR data points in the previous sampling instance; and determine a localization pose of the mobile robot with respect to the target object in the current sampling instance based on the desired LiDAR data points.

Preferably, the processor is further configured to: generate an improved map having a higher density of information than the initial map, for example in a compressed format; determine correspondence between the desired LiDAR data points and the improved map of the reference object to produce a confidence value of each correspondence; and obtain the localization pose based on the confidence values. In a specific embodiment, the processor is further configured to update the pose data representing estimated pose of the mobile robot based on the confidence values.

Advantageously, the system further comprises an odometer, for example a wheel odometer, and updating the pose data includes using odometry data of the mobile robot.

In a specific embodiment, the system may further comprise a distance-based filter operable to filter the current LiDAR data points based on respective distances of the LiDAR device to the current LiDAR data points; the desired LiDAR data points further including the distance-filtered LiDAR data points. The system may also comprise a random filter to filter the distance-filtered LiDAR data points to produce a reduced number of data points as the desired LiDAR data points.

It is envisaged that the reference object for creating the initial map may not be exactly the same as the target object.

In a specific embodiment, the processor is further configured to define identifiable reference points on the target object and in the initial map, and the system further comprises a laser pointer for generating reference markers for determining the localization pose of the mobile robot.

In a third aspect, there is provided a mobile robot comprising a system for localizing a mobile robot with respect to a target object using an initial map of a reference object which is a representation of the target object. The system comprises a LiDAR device mounted to the mobile robot and arranged to capture LiDAR data of the target object when the mobile robot is arranged to traverse in an environment associated with the target object, the LiDAR data including respective point cloud representations of the target object and the environment in various sampling instances. The system also includes a pose data update module arranged to iteratively update pose data representing an estimated pose of the mobile robot with respect to a known reference location in corresponding sampling instances when the mobile robot is arranged to traverse the environment; and a processor configured to: extract a subset of LiDAR data points in the point cloud representation of a previous sampling instance, the subset of LiDAR data points corresponding to features of the target object in the initial map based on the estimated pose of the mobile robot associated with the previous sampling instance; obtain desired LiDAR data points in the point cloud representation in a current sampling instance, the desired LiDAR data points including current LiDAR data points which correspond to the extracted subset of LiDAR data points in the previous sampling instance; and determine a localization pose of the mobile robot with respect to the target object in the current sampling instance based on the desired LiDAR data points.

In a fourth embodiment, there is provided computer readable medium storing instructions which, when executed by a processor, cause the processor to perform a method of localizing a mobile robot with respect to a target object using an initial map of a reference object which is a representation of the target object. The method comprises: obtaining LiDAR data of the target object captured by a LiDAR device of the mobile robot as the mobile robot traverses in an environment associated with the target object, the LiDAR data including respective point cloud representations of the target object and the environment in various sampling instances; iteratively updating pose data representing an estimated pose of the mobile robot with respect to a known reference location in corresponding sampling instances as the mobile robot traverses the environment; extracting a subset of LiDAR data points in the point cloud representation of a previous sampling instance, the subset of LiDAR data points corresponding to features of the target object in the initial map based on the estimated pose of the mobile robot associated with the previous sampling instance; obtaining desired LiDAR data points in the point cloud representation in a current sampling instance, the desired LiDAR data points including current LiDAR data points which correspond to the extracted subset of LiDAR data points in the previous sampling instance; and determining a localization pose of the mobile robot with respect to the target object in the current sampling instance based on the desired LiDAR data points. The computer readable medium may be transitory or non-transitory, tangible or intangible.

In a fifth aspect, there is provided a method of localizing a robot with respect to an object comprising the following steps:

(a) Generating a point-cloud map of the (target) object from a high-density point-cloud;

(b) Initialising a set of particles with an approximate robot pose;

(c) Updating the set of particles using odometry information;

(d) Extracting a sample of LiDAR points from a previous iteration which correspond to the point-cloud map in step (a);

(e) Matching and Filtering data from the sample of LiDAR points from the current iteration with high correspondence to LiDAR points in step (d);

(f) Filtering the current sampled data to probabilistically retain farther points;

(g) Computing confidence of the hypothesis, checking for correspondence between the data and the map based on a point-to-(high-density)-map algorithm;

(h) Estimating current robot pose based on the confidence of each particle;

(i) Resampling the particles based on confidence values;

(j) Repeating step (c)-(f) for the next sample instance.

The above method may enable correct preparing (or pre-processing) of the sensor input in order to enhance the localization accuracy with respect to a large object.

In a sixth aspect, there is provided a method of localizing a robot with respect to an object comprising the following steps:

a) Creating a point cloud map (retaining the piece-wise distribution information obtained from a high density point cloud) of only the target object using its ideal technical structure description;

b) Initializing certain set of hypotheses (i.e. particles) in the close vicinity of an initial approximate pose of the robot;

c) Iteratively updating the pose of the particles using information of the robot motion;

d) Based on the previous pose estimate of the robot, extracting parts of previous sample of LiDAR point cloud data which correspond well with the map;

e) For the latest sample of LiDAR point cloud data, extracting parts with high correspondence against the extracted parts of the previous LiDAR data;

f) Next, based on distance, filtering the extracted data from latest LiDAR sample to probabilistically retain farther points;

g) Obtaining final useful point cloud data in the current sampling instance by performing a simple random filtering on the distance-filtered data, to limit the number of points for fast processing in limited computational time;

h) In the measurement step, computing the confidence (i.e. weight) of each pose hypothesis (i.e. particle) by checking correspondence of final useful point cloud data at the respective hypothesis against the map. For correspondence checking, a point-to-(high-density)-map algorithm is implemented which may produce high quality results, even after heavy filtering on LiDAR data;

i) Based on the confidence of each hypothesis, estimating the current pose of the robot;

j) Probabilistically resampling the hypotheses based on the respective confidence values; and k) Repeating from step (c) in the next iteration (i.e. sampling instance) after obtaining next sample data from the LiDAR sensor.

It should be appreciated that features relevant to one aspect may also be relevant to other aspects.

BRIEF DESCRIPTION OF THE DRAWINGS

An exemplary embodiment will now be described with reference to the accompanying drawings, in which:

6

Figure 1:
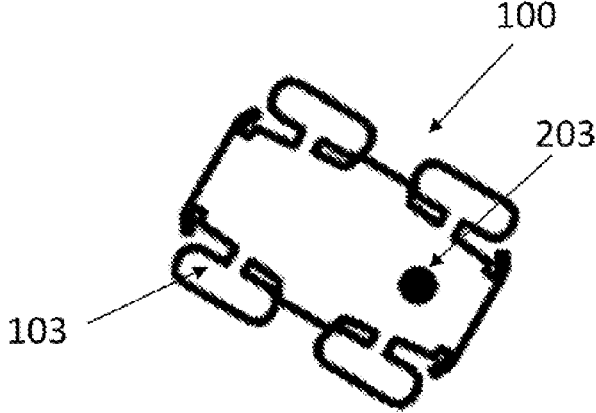
Figure 2:
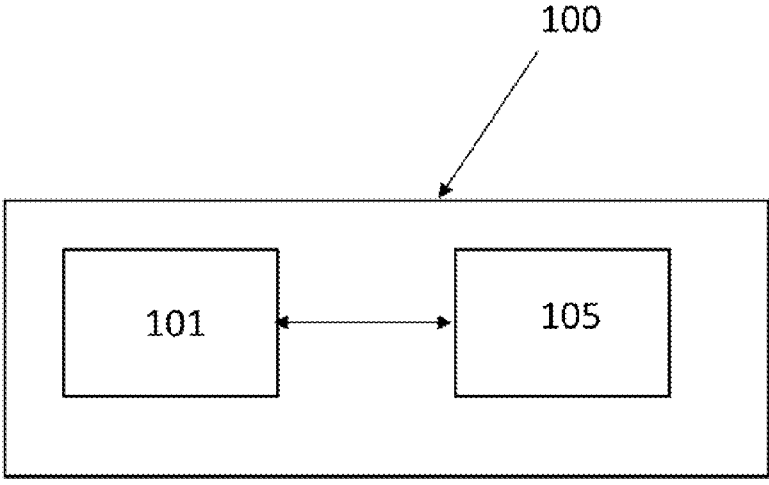
Figures 3A, 3B:
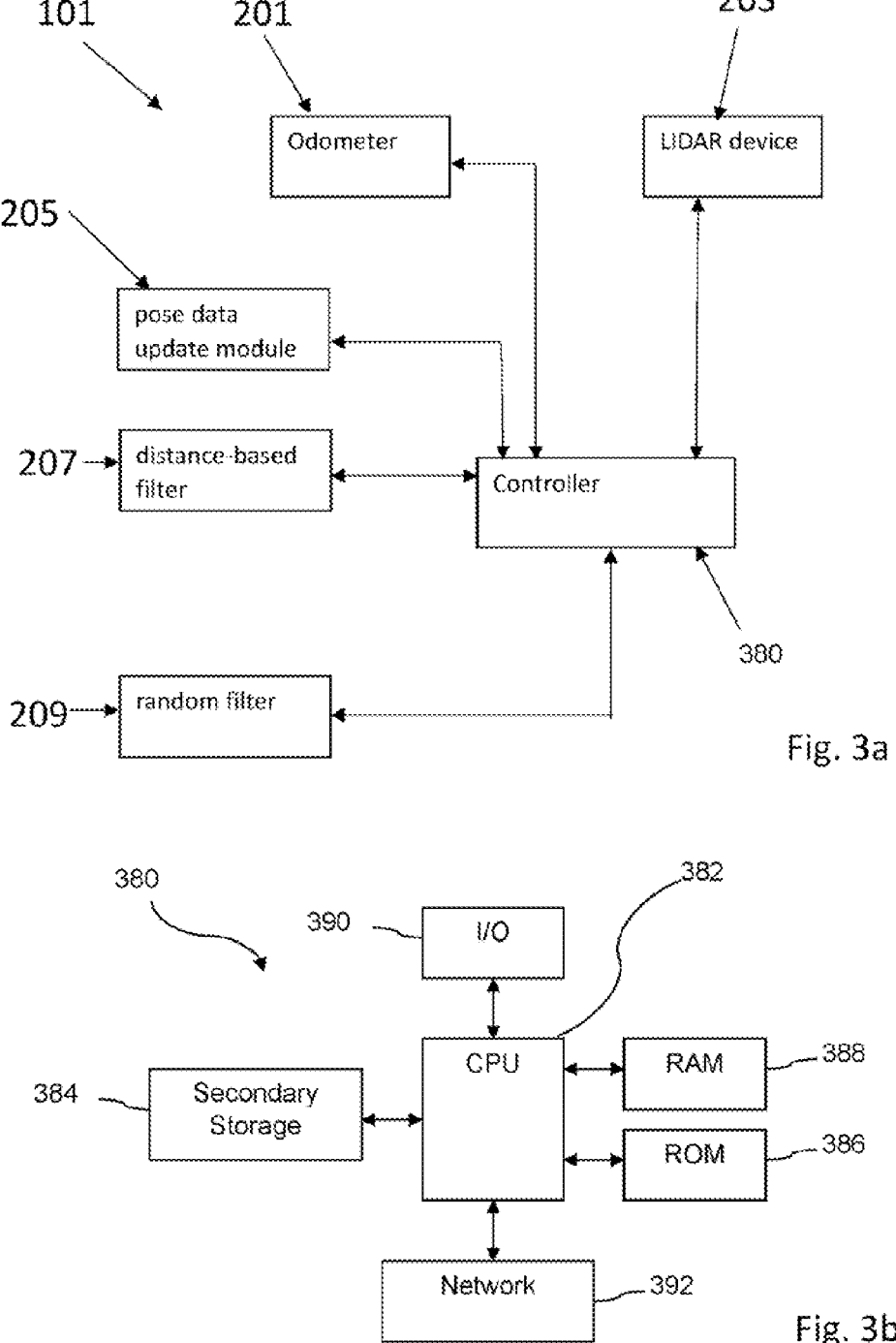
Figure 4:
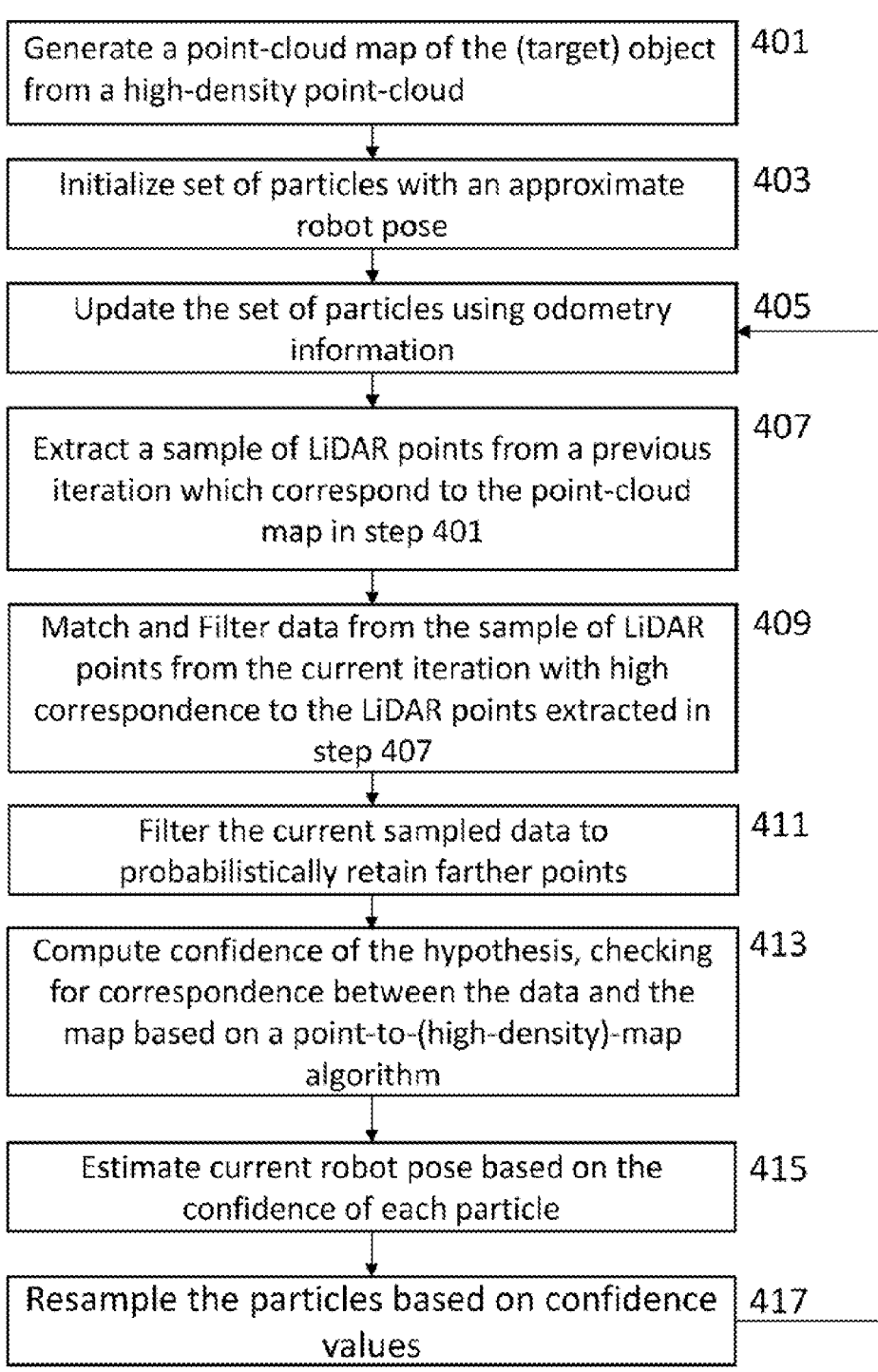
Figures 5A, 5B:
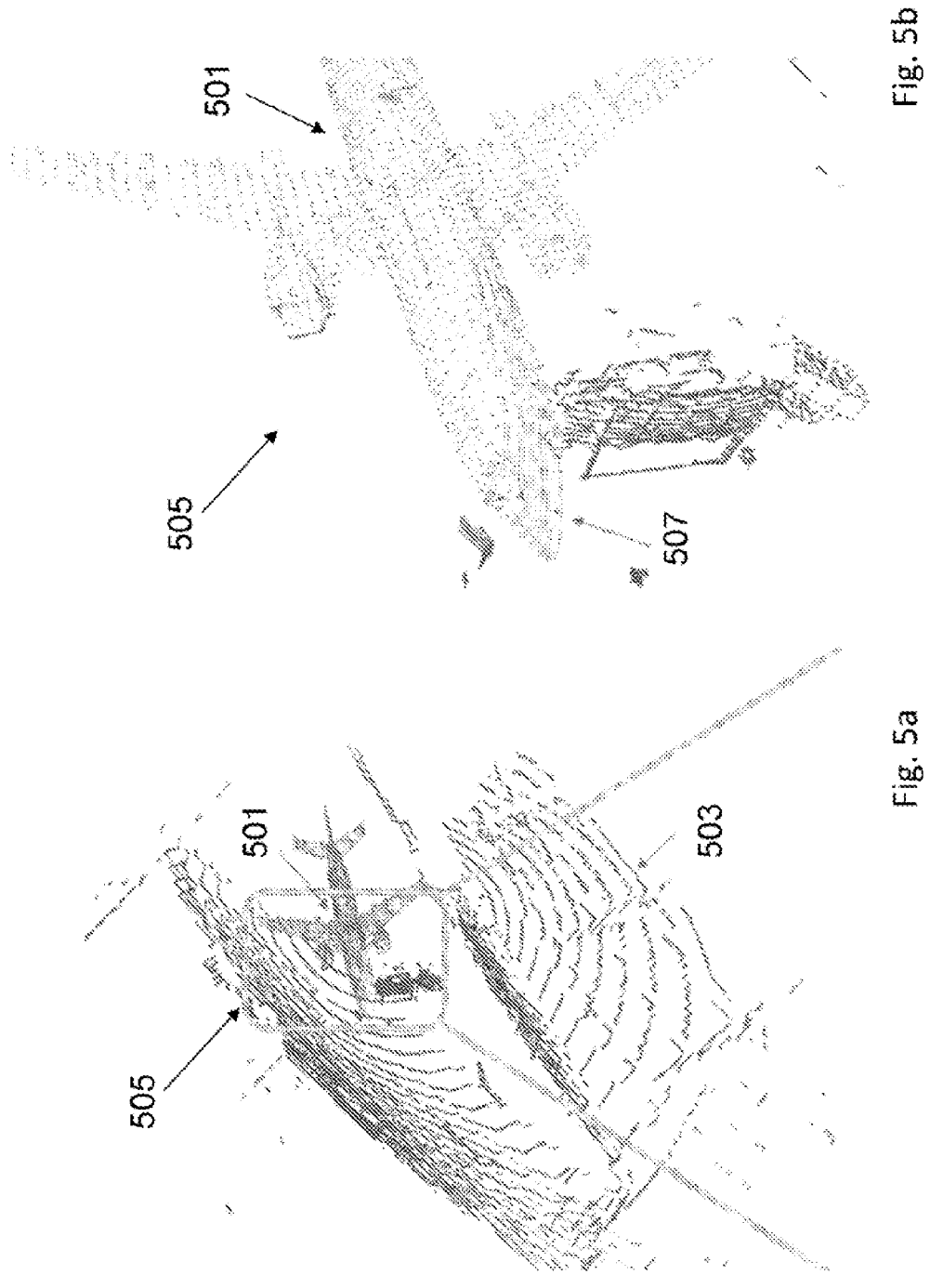
Figure 6:
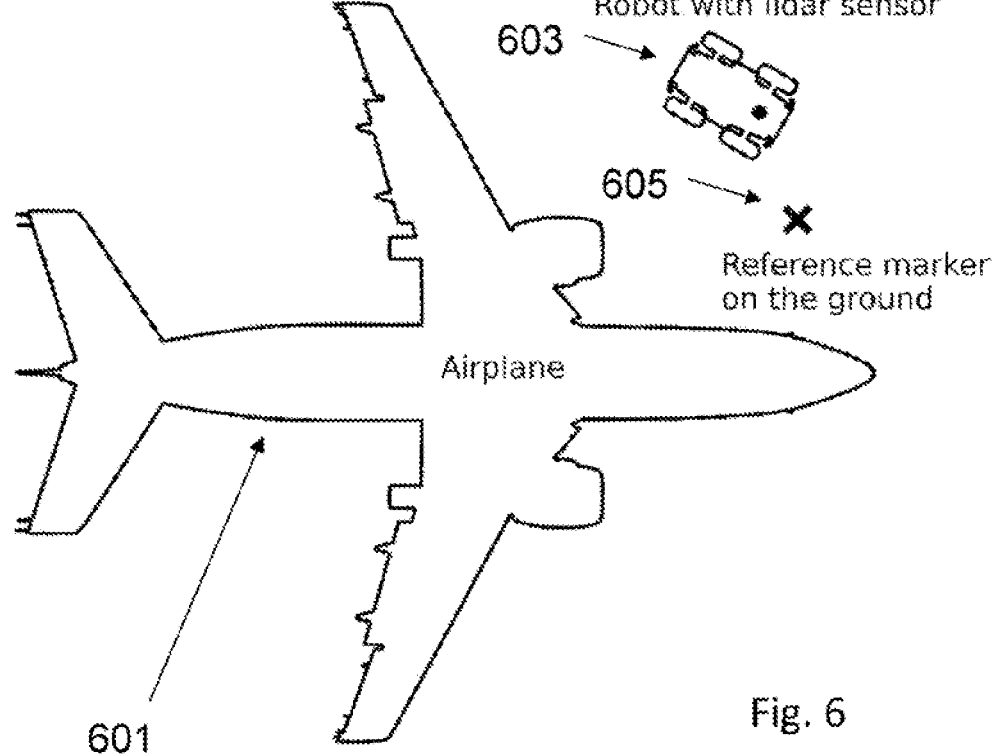
Figures 7A, 7B:
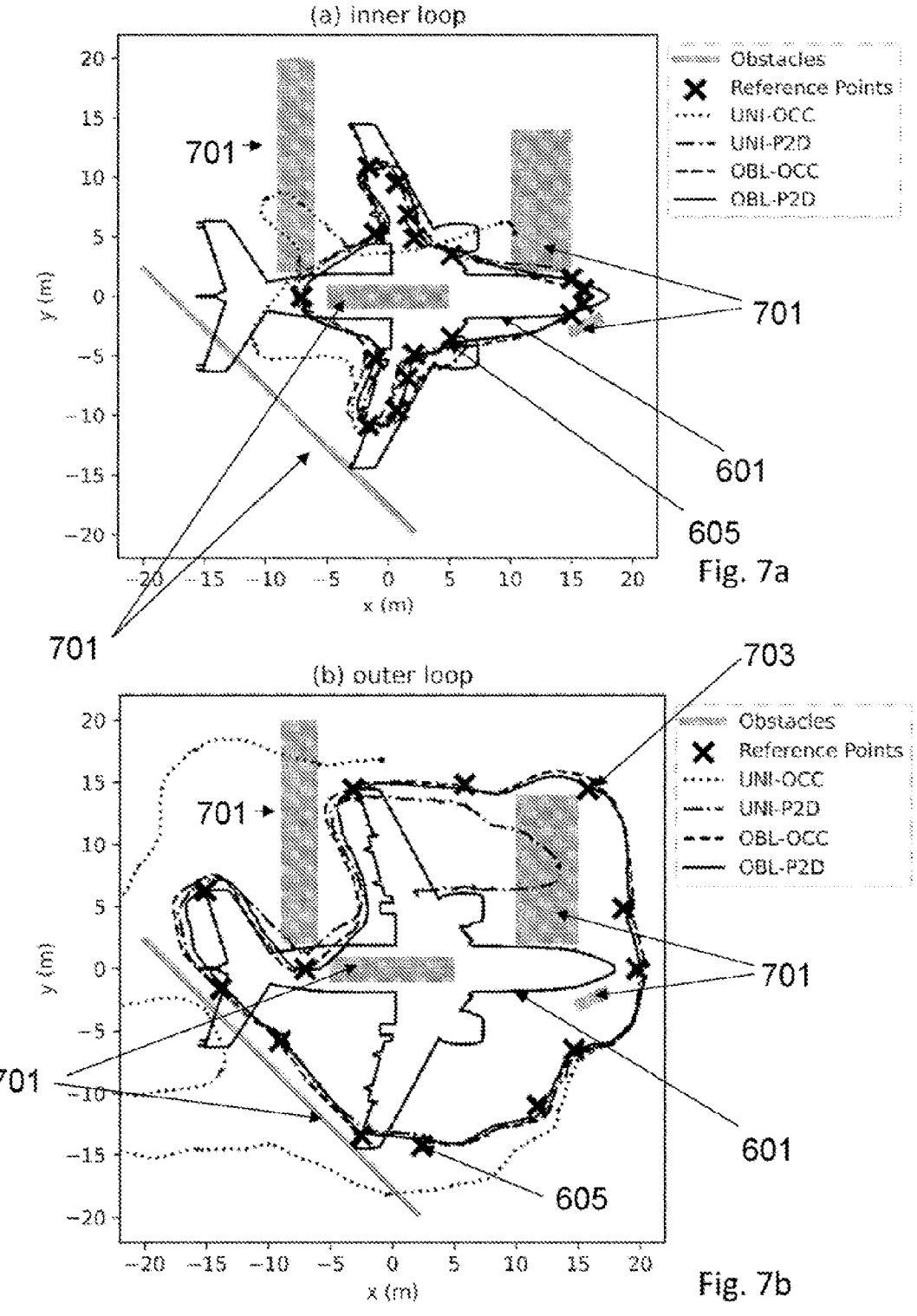

FIG. 1 is a schematic illustration of a mobile robot according to a preferred embodiment;

FIG. 2 illustrates the mobile robot of FIG. 1 in simplified block form;

FIG. 3a is a schematic block diagram of a system for localizing the mobile robot of FIG. 1 to a target object;

FIG. 3b is a schematic block diagram of a localization controller included in the system of FIG. 3a;

FIG. 4 is a method of localization performed by the mobile robot of FIG. 1;

FIG. 5a is a 3D point cloud map view of a target object, specifically an airplane and a LiDAR scan capturing the surroundings of the airplane;

FIG. 5b illustrates an enlarged portion of FIG. 5a highlighting extracted-useful LiDAR points on the airplane;

FIG. 6 illustrates an experimental setup of a mobile robot performing a method of localizing to a target object in the form of an airplane;

FIG. 7a illustrates results obtained using the experimental setup of FIG. 6, specifically the mobile robot's localization around the airplane in an inner loop using four different localization approaches including the localization method of FIG. 4; and FIG. 7b illustrates results obtained using the experimental setup of FIG. 6, specifically the mobile robot's localization around the airplane in an outer loop using four different localization approaches including the localization method of FIG. 4.

DETAILED DESCRIPTION OF PREFERRED EMBODIMENT

FIG. 1 illustrates a mobile robot 100 according to a preferred embodiment. In the described embodiment, the mobile robot 100 is in the form of a wheeled robot, specifically an unmanned ground vehicle (UGV) comprising four lateral wheels 103 for actuating motion of the UGV. The mobile robot 100 also includes a Light Detection and Ranging Sensor (LiDAR) device 203, for example a hemispherical LiDAR (RS-Bpearl), which is mounted to the mobile robot 100, and is configured to capture data including respective point cloud representations of a target object and an environment of the mobile robot 100 in various sampling instances t.

FIG. 2 illustrates the mobile robot 100 in simplified block form. The mobile robot 100 includes a localization system 101 for localizing the mobile robot 100 with respect to the target object, for example an airplane, and a motion controller 105. The motion controller 105 is configured to control an operation of the mobile robot 100 based at least in part on information received from the localization system 101, for example for navigation of the mobile robot 100.

As such, the motion controller 105 may comprise further computing devices having the same or a similar structure to that described in relation to FIG. 3b below. The motion controller 105 may comprise several sub-systems for controlling specific aspects of the movement of the mobile robot 100 including but not limited to a deceleration system, an acceleration system and a steering system. Certain of these sub-systems may comprise one or more actuators, for example the deceleration system may comprise brakes, the acceleration system may comprise a throttle, and the steering system may comprise an actuator to control the angle of turn of wheels of the mobile robot 100, etc.

Although the localization system 101 is shown as a separate module in FIG. 2, it is envisaged that it may form part of the motion controller 105.

FIG. 3a is a schematic block diagram of the localization system 101 according to the described embodiment. The localization system 101 includes a localization controller 380 in the form of a computing device, the LiDAR device 203, an in-built wheel odometer 201, a pose data update module 205, and two probabilistic filters 207, 209, specifically a distance-based filter 207, and a random filter 209. The localization controller 380 is in communication with each of the in-built wheel odometer 201, the LiDAR 203, the pose data update module 205, the distance-based filter 207, and the random filter 209. The in-built wheel odometer 201 is configured to measure the distance travelled by the mobile robot 100 based on sensing rotation of the wheels of the mobile robot 100.

Each of the pose data update module 205, the distance-based filter 207, and the random filter 209 may comprise further computing devices having the same or a similar structure to that described below in accordance with FIG. 3b. Although the pose data update module 205, the distance-based filter 207, and the random filter 209 are shown as separate from the localization controller 380, it is envisaged that they may form part of the localization controller 380, for example, the localization controller 308 may itself perform the function of one or more of the pose data update module 205, the distance-based filter 207, and the random filter 209 in addition to the functions attributed to the localization controller 380 in the below description.

The localization controller 380 is illustrated in more detail in FIG. 3b. The processor 382 (which may be referred to interchangeably as a central processor unit or CPU) is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the localization controller 380, at least one of the CPU 382, the RAM 388, and the ROM 386 are changed, transforming the localization controller 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the localization controller 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include connections to each of the other components of the localization system 101, specifically the in-built wheel odometer 201, the LiDAR 203, the pose data update module 205, the distance-based filter 207, and the random filter 209 for the exchange of data with those components. I/O devices may further include video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the below-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the localization controller 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the localization controller 380 to provide the functionality of a number of servers that is not directly bound to the number of computers in the localization controller 380. For example, virtualization software may provide twenty virtual servers on four physical computers. In an embodiment, the functionality disclosed herein may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed herein may be provided as a computer program product. The computer program product may comprise one or more computer readable storage medium having computer usable program code embodied therein to implement the functionality disclosed herein. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the localization controller 380, at least portions of the contents of the computer program product to the secondary storage 384, to the ROM 386, to the RAM 388, and/or to other non-volatile memory and volatile memory of the localization controller 380. The processor 382 may process the executable instructions and/or data structures in part by directly accessing the computer program product, for example by reading from a CD-ROM disk inserted into a disk drive peripheral of the localization controller 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the localization controller 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the localization controller 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

It will be appreciated that the localization controller 380 may comprise more or fewer components than illustrated in FIG. 3b. For example, the localization controller 380 may not have network connectivity and, as such, the network connectivity devices 392 may be omitted.

FIG. 4 illustrates a method of localizing the mobile robot 100 with respect to the target object performed by the localization system 101 according to the described embodiment. In the described embodiment, the method of FIG. 4 is performed at least in part by executing software on the CPU 382 of the localization system 101. The method includes steps 401 to 417.

In step 401, an initial reference map in the form of a point cloud map M having $N_m$ number of points, $M \in \mathfrak{R}^{N_m \cdot 3}$, and containing a representation of the target object is obtained. Preferably, the map M is a high-density point cloud, for example, a point cloud having greater than about one point in 1 cm$^3$.

In an example, the map M is in the form of a NDT (Normal Distribution Transform) map of the target object created from a virtual representation of the object (such as Computer-Aided Design (CAD) model) by sampling the points on the object's outer surface within a specified 3D space density threshold (such as a minimum 1 point per every 1 cm$^3$ of space which encapsulates any part of the outer surface of the object). This process may be performed only once and may be performed by a computing device of the mobile robot 101, for example the controller 380. Alternatively, the map M may be generated by a computing system external to the mobile robot 101 and stored in one or more of the ROM 386 or other storage devices of the localization controller 380.

In step 403 the localization system 101 performs initialization with an approximate robot pose. In the described embodiment, as in Monte-Carlo Localization (MCL), robot localization pose $$x_t^R \in \mathfrak{R}^6$$

at time, or sampling instance t is estimated as a weighted-average of a set of $N_p$ particles, with weights $$w_t^k$$

and poses $$x_t^k \in \mathfrak{R}^6$$

with respect to a known reference location on the target object as follows (i.e. a weighted average of the particle poses):

$$x_t^R = \frac{1}{N_p} \sum_{k=1}^{N_p} w_t^k x_t^k \quad (1)$$

It should be appreciated that although the initial equation for the approximate robot is the same as that employed in MCL, the subsequent steps 405-417 of the approach according to the described embodiment diverge significantly from the conventional MCL approach.

To begin the initialization, the pose data update module 205 performs one-time initialization of the particles in the set $N_p$ with normalized equal weights $$w_t^k\big|_{t=0} = 1/N_p$$

and Gaussian randomly distributed poses $$w_t^k\big|_{t=0}$$

around an initial pose estimate with respect to the known reference location.

For example, the initial pose may be defined by a user of the mobile robot 100, for example via an input to one of the I/O devices 390 of the localization controller 380. It will be appreciated that the initial pose may be defined in other ways.

Next, the LiDAR device 203 captures an initial set of points containing $$N_{P_t}\big|_{t=0}$$

number of points, $$P_t\big|_{t=0} \in \mathfrak{R}^{N_{P_t},6}.$$

In step 405 the mobile robot 100 moves, for example via actuation by the motion controller 105 to a subsequent position at t>0. As the robot moves, particle poses are updated by the localization controller 380 as $$x_t^k = x_{t-1}^k + u_t + \epsilon_t^k,$$

where + represents transformation addition, and $u_t$ is the delta motion of robot in sampling period (t−1, t], i.e. between sampling instances t−1 (exclusive) and t (inclusive). $u_t$ is calculated by processing, at the CPU 382 of the localization system 101, wheel odometry data received from the in-built wheel odometer 201. Note that a zero mean and small variance Gaussian Distribution noise $$\epsilon_t^k$$

is also added to represent model motion uncertainty.

In addition, the LiDAR device 203 captures a set of data points $P_t$ containing $N_{P_t}$ number of LiDAR points and communicates the set of data points $P_t$ to the processor 382 for processing.

In steps 407 and 409, the localization controller 380 extracts a useful set of points $$P_t^o \subset P_t$$

from the complete data set $P_t$ by matching $P_t$ against $P_{t-1}$, i.e. the LiDAR points from the previous iteration, after they themselves have been matched against M. For example, at the sampling instance t=1, $P_t|_{t=0}$ is first matched against M, and $P_{t-1}$ is then matched to $P_t|_{t=0}$.

Specifically, in step 407, the localization controller 380 extracts a sample of LiDAR points $\hat{P}_{t-1}$ from the previous iteration, i.e. sampling instance t−1 (i.e. from the initialization step 403 if this is the first iteration) based on their correspondence with the point cloud map M. Specifically, since $$x_{t-1}^R$$

is already estimated, $P_{t-1}$ is transformed to $$x_{t-1}^R$$

to be represented in the map coordinate frame. This step helps identify parts of $P_{t-1}$ which match well with M. Specifically, it is defined that $$\hat{P}_{t-1} = \Lambda\left(P_{t-1} + x_{t-1}^R, M\right) + \left(x_{t-1}^R\right)^{-1} \quad (2)$$

as the subset of $P_{t-1}$ (in the $P_{t-1}$ coordinate frame) which match well with M given robot pose estimate $$x_{t-1}^R.$$

Here, + indicates a transformation and $(x)^{-1}$ indicates an inverse transformation of x, i.e.

$$\left(x_{t-1}^R\right)^{-1}$$

shifts the points matched with M back from the map coordinate frame to the LIDAR (i.e. $P_{t-1}$ coordinate) frame.

The lambda function $\Lambda(\bullet,\bullet)$ returns parts of a first input which match well to a second input using, for example a 3D cell occupancy matching method. Specifically, in the 3D cell occupancy approach applied according to the described embodiment, the raw point cloud is converted to an occupancy grid map, i.e. the 3D space is divided into equal sized cubic 3D grid cells, typically called voxels, from which the occupancy map is constructed by checking whether a point (from the point cloud, i.e. M) is present in a certain specified voxel. During occupancy matching, the new point cloud $$\left(P_{t-1} + x_{t-1}^R\right)$$

in the described embodiment) is checked against the occupied voxels obtained from M. Finally, the centre of the grid cells are returned as output of the lambda function $\Lambda(\bullet,\bullet)$.

In other words, a subset of LiDAR data points $\hat{P}_{t-1}$ in the point cloud representation $P_{t-1}$ of a previous sampling instance t−1 is extracted based on based on the estimated pose $$x_{t-1}^R$$

of the mobile robot 100 associated with the previous sampling instance.

Second, in step 409 the desired set of points $$P_t^o$$

for the present sampling instance t is obtained by the localization controller 380 by matching $P_t$ with $\hat{P}_{t-1}$ transformed to coordinate frame of $P_{t-1}$ via delta motion of robot $u_t$, as follows $$P_t^o = \Lambda\left(P_t, \hat{P}_{t-1} + u_t\right) \quad (3)$$

Thus, the desired LiDAR data points $$P_t^o$$

include current LiDAR data points $P_t$ which correspond to the extracted subset of LiDAR data points $\hat{P}_{t-1}$ in the previous sampling instance.

In step 411 the distance-based filter 207 performs filtering of the current LiDAR data points based on respective distances of the LiDAR device to the current LiDAR data points and a distance-filtered set of LiDAR points $$P_t^f \subseteq P_t^o$$

is obtained.

In the described embodiment, $$P_t^f$$

is determined by defining the probability of a $i^{th}$ LiDAR point $$p_t^i = \left[x_t^i, y_t^i, z_t^i\right]^T \in P_t^o$$

being captured in $$P_t^f$$

is as $$l_t^{i(f)} = \frac{\sqrt{\left(x_t^i\right)^2 + \left(y_t^i\right)^2}}{D} \quad (4)$$

where D is the normalization constant, which, in practice, is equal to the maximum length in the horizontal x-y plane recorded in each LiDAR scan. Thus, the probability of retaining $$p_t^i$$

is proportional to its distance from the sensor.

Finally, the random filter 209 optionally performs a simple random filtering of the desired data points to obtain $$P_t^f,$$

having a reduced number of data points which may enable fast processing in limited computational time.

In step 413, the localization controller calculates confidence values $$w_t^k$$

for each particle based on the filtered, desired LiDAR data points $$P_t^f.$$

In the described embodiment, in order to compensate for the reduced density of the filtered, desired LiDAR data points $$P_t^f$$

as a result of the above filtering processes, as part of step 413, an improved map having a higher density of information than the initial point cloud map M is employed by the localization controller 380.

Specifically, in the described embodiment, the density of information in the map M is increased by implementing a Point-To-Distribution (P2D) Measurement Model, similar to the approach outlined in *Sparse-3D LiDAR Outdoor Map-Based Autonomous Vehicle Localization* (S. Z. Ahmed, V. B. Saputra, S. Verma, K. Zhang, and A. H. Adiwahono, 2019) but adapted for use with the much lower number of LiDAR points $$N_{P_t^f},$$

which are output as a result of steps 409 and 411 above.

In this approach, the improved map stores information in the form of normal distribution for voxels in the map space. The normal distribution is calculated using points in the initial point cloud. Specifically, the point cloud map M is converted to a set of $N_m$ 3D grid cells with the original point cloud data corresponding to a particular cell represented within the cell by a continuous distribution described by Normal Distribution Transform (NDT) parameters comprising mean ($\mu \in \Re^6$) and co-variance ($\Sigma \in \Re^{6 \times 6}$) of the point cloud data within the cell, or voxel. In other words, the point cloud map is converted to piece-wise sets of continuous distributions, i.e. the information in the improved map is formatted differently and is denser, or compressed, relative to the initial map. Thus, an improved map enabling a higher density of correspondences to be retained even when filtering is performed is generated.

The weight of the $k^{th}$ particle (i.e. the confidence value of the hypothesis corresponding to the $k^{th}$ particle) is then produced by the localization controller 380 by determining the correspondence between the desired and subsequently filtered LiDAR points and the improved point cloud map $$w_t^k = d_1 + d_2 \sum_{i=1}^{N_{P_t^f}} \sum_{j=1}^{N_m} \exp\left(-\frac{d_3}{2}(e_{t,j}^k)^T \sum_j{}^{-1} e_{t,j}^k\right) \qquad (5)$$

where $$e_{t,j}^k = \left(p_t^f + x_t^k\right) - \mu_j \text{ and } p_t^f \in P_t^f$$

and, $d_1$, $d_2$ and $d_3$ are tuning scalars. In practice, the tuning scalar values $d_1$, $d_2$ and $d_3$ are determined by considering the desired effect of $$e_{t,j}^k \text{ on } w_t^k.$$

For example, high $d_1$ may lead to a substantially constant value of $$w_t^k$$

value with respect to k. Similarly, $d_2$ and $d_3$ control linear and exponential variations respectively of $$w_t^k \text{ as } e_{t,j}^k$$

changes. Eqn. (5) effectively determines the confidence value $$w_t^k$$

for each particle by determining a correspondence between the filtered desired LiDAR data points $$p_t^f \in P_t^f$$

and the improved point cloud map of the representation of the target object to produce the confidence value $$w_t^k$$

of each correspondence.

In step 415

$$w_t^k$$

is normalized and the localization controller 380 calculates an updated robot pose for time t using Eqn. (1) (with $$x_t^k$$

having been calculated in step 405). Thus, the localization pose of the mobile robot 100 with respect to the target object in the current sampling instance t based on the desired LiDAR data points (with additional filtering, as described above) is determined.

In step 417 the pose update data update module resamples the particles with a probability proportional to $$w_t^k$$

calculated in step 415.

Upon further movement of the mobile robot 100, the method returns to step 405 for the next sampling instance, and so on. Thus, LiDAR data of the target object captured by the LiDAR device 203 of the mobile robot 100 is obtained as the mobile robot 100 traverses in the environment, and the pose data—in the form of the set of $N_p$ particles—representing the estimated pose of the mobile robot with respect to the known reference location in corresponding sampling instances is iteratively updated by the pose data update module 205 as the mobile robot traverses the environment.

It should be appreciated one or more of the steps 401 to 417 may be performed in an order different from that described above and shown in FIG. 4, for example, the particles may be resampled prior to estimating the current robot pose. Further, additional steps not shown in FIG. 4 may be implemented according to embodiments.

In use, therefore, the localization system 101 according to the described embodiment utilizes LiDAR sensors to generate a 3D point cloud which it compares to a high-density map of the object. The localization system 101 extracts only the points determined to be most likely to represent the target object (based on previous LiDAR scan data) for use in determining the pose of the mobile robot 100, with the remainder of the LiDAR scan points being discarded. Unlike conventional environment-based localization techniques with 360° horizontal sensor perception of the whole surrounding environment, localization with respect to a target object may be challenging due to narrow sensor perception of the target object. A LiDAR scan in the vicinity of a target object typically captures only a few points representing the target object, with the majority of points corresponding to the target object's surroundings. This is illustrated in FIGS. 5a and 5b which show a 3D point cloud map view of an airplane 501 and corresponding points obtained from a particular LiDAR scan 503 with FIG. 5b showing only the area indicated by the box 505 in FIG. 5a. As is visible from FIG. 5b only a relatively small percentage 507 of the captured LiDAR points in the LiDAR scan 503 correspond to the airplane 501 and are therefore useful for object-based localization. Typically, this is less than 5% of the whole of the captured LiDAR scan data. To complicate matters further, the map of a target object may be generated via an ideal model of the object, which may differ from its real shape/structure and the presence of several static and dynamic obstacles of varied sizes in close vicinity of the target object, such as humans, staircases, etc may substantially hinder the sensor perception, by increasing quantity of non-target object data in the sensor output. Limited effective Field-of-View of the object further hinder the robot perception. By implementing the localization method of the described embodiment some of the LiDAR data of FIG. 5a which are not relevant for object-based localization of the mobile robot 100 may be discarded, which may enable the above issues to be addressed.

Specifically, points are extracted from the LiDAR data in the latest sampling instance t, which are most likely to correspond only to the target object. To make this step possible, the time-invariant map (which contains only the target object) and the estimated robot pose (i.e. position and orientation of the robot, and thereby the LiDAR sensor itself, in the map coordinate frame) from the previous sampling instance are leveraged. Technically speaking, once the robot pose is estimated in the current sampling instance (using the localization method of the described embodiment), the LiDAR data can be transformed to the map coordinate frame.

Therefore, in contrast to conventional Monte Carlo Localization (MCL), for example, in which $$w_t^k$$

is calculated depending simply on the quality of match between $P_t$ and M in the approach according to the described embodiment, specific parts of the LiDAR data are extracted which may have high correspondence with the map according to the current estimate of robot pose. In other words, these extracted specific parts of the LiDAR data may mostly retain LiDAR data corresponding to the target object. Next, this specific part of the LiDAR data is projected forward into the next sampling instance t+1 using robot dynamics information. Later at the next sampling instance t+1, useful parts of the newly obtained LiDAR data are obtained which lead to correspondence with the time-projected specific part of the previous LiDAR data. The useful parts of the LiDAR data in the new sampling instance t+1 may correspond only to the target object, while removing all other information from LiDAR data which might correspond to other objects in the vicinity of the sensor. As the map in object-based localization only consists of the target object, and an incorrect match between the LiDAR data and the map will likely lead to a particle with incorrect pose getting higher influence in robot pose estimation, this may improve the accuracy of localization.

The extracted part of the LiDAR data is also further processed before determining a correspondence with the map to obtain the new robot pose in the latest sampling instance. Specifically, two probabilistic filters are introduced specifically to bolster the horizontal localization accuracy. First, a distance-based filter is implemented to retain relatively higher quantity of points more distant from the LiDAR device 203 in $$P_t^o.$$

Typically, LiDAR sensors are designed with a rotating element projecting diverged laser rays, resulting in sparse LiDAR points at farther distances. In contrast, the quality of localization is typically dependent on the relatively more distant LiDAR points because more distant points may help improve LiDAR scan match with a larger portion of the map. Thus, distance-based filtering as employed in the described embodiment may improve the accuracy of the localization. Second, a random filter is implemented. Thereafter, the cycle of extracting specific parts of the new LiDAR data in preparation for the next sampling instance continues.

Thus, the extraction process leverages on the motion of the mobile robot 100 and a subset of old sensor data that is already matched to the map. Accordingly, a significant amount of noise in the sensor data may be straightforwardly filtered out.

In addition to the extraction process, the localization method performed by the mobile robot 100 according to the described additionally implements a second sensor data processing step. Specifically, an enhanced map matching approach may compensate for the lower amount of extracted/available sensor data by leveraging on increased map density.

Specifically, as the number of extracted LiDAR points $$N_{P_t^f}$$

following filtering may be reduced relative to the original set of LiDAR points, depending on the effective field of view of sensor perception of the target object, the method of the described embodiment leverages on the high density of M to compensate for this reduction by implementing a Point-To-Distribution (P2D) Measurement Model. Thus, the object-based filtering methods of the described embodiment may be employed while simultaneously avoiding a reduction in the quality of the representation of the target object and, thus, the accuracy of localization may remain robust even if the number of LiDAR points employed is significantly reduced. In addition, since the map only contains the target object, increasing map density may not have a significant effect on the map file size.

The localization method of FIG. 4 may enable localization to an accuracy within an order of a centimetre.

A prototype mobile robot 603 configured to perform the method of FIG. 4 was employed to obtain experimental results and to demonstrate some of the above described advantages. The experimental set up is illustrated in FIG. 6. The test target object 601 was a Boeing 737-301 airplane. As illustrated in FIGS. 7*a* and 7*b*, five static obstacles 701 were present in the vicinity of the airplane. Additionally, a few dynamic obstacles including humans and small machines were also navigating around the airplane during experimentation trials.

The point cloud map of the airplane was constructed using a CAD model of a slightly older variant model, i.e. Boeing 737-300 (with origin located at the top center of the airplane and, directions x forward, y left and z upwards, as shown in FIGS. 7*a* and 7*b*). The difference between the point cloud map and real airplanes typically include dissimilarities in the design and position/orientation of the wings and, therefore this feature was incorporated to test localization robustness under these circumstances.

The LiDAR of the prototype mobile robot 603 was one hemi-spherical LiDAR (RS-Bpearl) looking upwards with 90° vertical FoV and 360° horizontal FoV such that the prototype mobile robot 603 could perceive the airplane from any location on the ground. The sampling rate was 10 Hz. The amounts of motion model noise added to the system were 0.1 m/s for each of x, y, z and, 5.0°/s for both roll, pitch and, 10.0°/s for yaw. The initialization pose was provided with about 0.3 m and 10.0° accuracy with respect to one of the known reference positions In order generate reference waypoints of the pose of the prototype mobile robot 603 directly in the map coordinate frame (since the airplane map did not contain anything from the surroundings of the airplane) an innovative two-step reference waypoints 605 generation technique was implemented. First, suitable reference points on the airplane were defined which could be easily identified both on the real airplane as well as its counterpart in the map (such as a wingtip). Second, a laser pointer, such as a low-cost class 1 laser typically used for presentations and other similar uses, was employed. A structure was provided around the laser pointer to keep the laser pointer upright so that the laser could point vertically upward (thanks to gravity pulling its weight downward). This way, the laser pointer helped to bring the reference points on the airplane vertically down on to the ground. Hence, waypoints on the ground enabled estimation of the true pose of the prototype mobile robot 603 with respect to the airplane reference points. The position of some of the reference markers (not directly under the airplane) were calculated with respect to those already marked on the ground using the laser pointer. Thereafter, while the robot localized with respect the airplane, its true position was captured with respect to the reference markers placed on the ground.

Localization performance was tested using two loops: an inner loop i.e. closer to the airplane fuselage and, an outer loop i.e. covering airplane's periphery (with some detours to counter the obstacles) as shown FIGS. 7*a* and 7*b*, respectively. From a real-life application perspective, the inner loop was generated to replicate scenarios in which a mobile robot is providing physical maintenance service to the airplane. The outer loop was designed to test the robustness of robot localization according to the described embodiment since the number of LiDAR points on an airplane decreases exponentially as a robot moves farther from the airplane. Along both loops, a sequence of reference markers was placed which the robot visited physically thereby helping to quantify the performance of the localization approaches.

The object-based localization based on filtering to obtain the desired det of points $$P_t^o$$

(as embodied in Eqn. (3), denoted OBL in the below description) was compared against a known filtering approach, specifically uniform down-sample filtering (UNI). In parallel, the P2D measurement model according to the described embodiment (as embodied in Eqn. (5)) was compared against a 3D cell occupancy model (OCC, embodied by function $\Lambda(\cdot)$ in Eqn. (2)) and combinations of all four approaches were compared. The results are illustrated in FIGS. 7*a* and 7*b* from which it is clearly visible that for both loops, the UNI-OCC approach drifts away significantly from the reference points 605. In contrast, for the inner loop shown in FIG. 7*a*, localization based on UNI-P2D, OBL-OCC and OBL-P2D did not drift away from the reference points 605.

TABLE 1

| Absolute Mean and Maximum of Localization Error (m) at Reference Waypoints for Inner Loop | | | | | |
| --- | --- | --- | --- | --- | --- |
| | Mean | | | Maximum | | |
| | x | y | z | x | y | z |
| UNI-OCC | 3.73 | 1.84 | 0.50 | 8.12 | 5.80 | 2.36 |
| UNI-P2D | 0.63 | 0.44 | 0.76 | 1.77 | 2.17 | 2.75 |
| OBL-OCC | 0.49 | 0.33 | 0.39 | 1.14 | 0.78 | 0.89 |
| OBL-P2D | 0.47 | 0.23 | 0.27 | 0.85 | 0.49 | 0.53 |

However, table 1 shows the absolute mean and maximum error of all four localization approaches for the inner loop along individual global coordinate axis, from which it is observed that OBL-P2D, i.e. localization performed according to the described embodiment, gave rise to lower error values than the other approaches.

The results in Table 1 also demonstrate that OBL-OCC/ P2D may give rise to lower mean errors and lower maximum errors compared with UNI-OCC/P2D, suggesting that, irrespective of the measurement models OCC or P2D, the proposed point cloud filtering OBL approach may be more accurate than UNI point cloud filtering.

TABLE 2

Absolute Mean and Maximum of Localization Error
(m) at Reference Points for Outer Loop

|  | Mean | | | Maximum | | |
|---|---|---|---|---|---|---|
|  | x | y | z | x | y | z |
| UNI-OCC | 10.72 | 7.76 | 6.30 | 31.62 | 18.57 | 12.14 |
| UNI-P2D | 2.61 | 1.38 | 2.26 | 17.74 | 6.06 | 8.74 |
| OBL-OCC | 0.47 | 0.25 | 0.42 | 0.95 | 0.56 | 0.93 |
| OBL-P2D | 0.33 | 0.14 | 0.17 | 0.76 | 0.68 | 0.38 |

A similar set of results were obtained from the outer loop, as depicted in FIG. 7b and, Absolute Mean and Maximum of Localization Error results in Table 2. However, two key differences compared to the inner loop were observed.

First, the mean errors were relatively lower for the outer loop. This is because when the mobile robot was moving at the periphery of the airplane, the LiDAR was able to perceive a lot of points on the whole airplane body which may have promoted a better match with the map. In contrast, for the inner loop, the LiDAR view was primarily limited to the underneath of the fuselage and wings.

Second, in contrast to the mean errors, the maximum errors for the outer loop were relatively higher than for the inner loop. The maximum error was primarily observed in the most challenging areas of the environment, such as around reference point 703 located at {x: 16, y: 15}, where the LiDAR view of the airplane was blocked by an obstacle in close vicinity to the front-left of the airplane. In fact, at this particular reference point 703, it may be observed from FIG. 7(b) that the UNI-P2D approach completely failed to track the designated route. Here, the OBL-OCC/P2D approaches were still able to maintain reasonable accuracy, due to LiDAR point extraction directly on the airplane itself. Even though the number of extracted LiDAR points was relatively low using the OBL approach, the localization robustness around such challenging environments remained high.

In summary, from both Tables 1 and 2, the OBL approach—i.e. extracting useful LiDAR points directly corresponding to the target object 601—resulted in an improvement robot localization performance relative to the other techniques. Specifically, for both inner and outer loops, as shown in FIGS. 7a and 7b, respectively, the maximum errors were below 1 m in all but one instance.

With regard to the measurement model embodiment, OBL-P2D demonstrated improved localization accuracy relative to OBL-OCC, due to P2D leveraging map density for use with limited number of extracted LiDAR points. Nevertheless, for both inner and outer loops, both OBL-OCC and OBL-P2D approaches tracked the reference points without drifting away, in contrast UNI-OCC/P2D.

Thus, the experimental results indicate that the localization method of the described embodiment may enhance the robustness and accuracy of the robot localization with respect to a large object in an unbounded area.

The described embodiment should not be construed as limitative.

For example, although experimental results were obtained with reference to an airplane as a target object 601, it will be appreciated that mobile robots according to embodiments are suitable for use with other real-world target objects, in particular, but not exclusively with real-world target objects which are significantly much larger than the mobile robot.

Although, the LiDAR sampling rate was of the prototype mobile robot was 10 Hz, it is envisaged that higher sampling rates may be employed, for example about 20 Hz or up to about 80 Hz, or even higher.

Although distance based filtering and random filtering are described as being employed in the method of localization according to the described embodiment, it is envisaged that one or more of these filtering techniques could be omitted, in which case the desired LiDAR data points $$p_t^o \in P_t^o$$

are directly employed in place of $$p_t^f \in P_t^f$$

in Eqn. (5)

Although a P2D model is described as being employed in the method of localization according to the described embodiment, it is envisaged that P2D may be omitted and, instead, the confidence value $$w_t^k$$

may be calculated based on correspondence with the initial point cloud map M, for example, by employing cell occupancy matching using the lambda function $\Lambda(\bullet,\bullet)$.

Although distance-based filtering according to Eqn. (4) is described above, it is envisaged that other forms of distance-based filtering could be implemented in accordance with embodiments.

Although initialization of the robot pose is described in step 403 above, it is envisaged that the initialized robot pose $$x_t^R\big|_{t=0}$$

and the initialized confidence values $$w_t^k\big|_{t=0}$$

may be predefined, for example via an input to the localization controller 101 stored in one or more memory devices of the localization controller 101, for example the localization controller 101 may store the last known position of the mobile robot 100.

It is envisaged that the mobile robot 100 may not comprise a wheel odometer and may instead determine the delta motion of robot, $u_t$, via an alternative method, for example, by employing robot dynamics, robot inertia, etc. or another type of odometer such as a visual odometer, a lidar odometer, etc.

Although, for testing the localization of the mobile robot 100, reference markers are described as being generated using a laser pointer, it should be appreciated that alternative methods of determining reference positions for testing the mobile robot 100 may be employed.

Although a P2D-based method of generating the improved map is described above, it is envisaged that other techniques of increasing the information density of a point cloud map may be employed according to embodiments.

Having now fully described the invention, it should be apparent to one of ordinary skill in the art that many modifications can be made hereto without departing from the scope as claimed.

The invention claimed is:

1. A method of localizing a mobile robot with respect to a target object using an initial map of a reference object which is a representation of the target object, the mobile robot comprising a pose data update module, a motion controller, a LiDAR device and a localization controller communicatively coupled to the pose data update module, the motion controller and the LiDAR device, the method comprising (i) obtaining LiDAR data, by the localization controller, of the target object captured by the LiDAR device of the mobile robot as the mobile robot traverses in an environment associated with the target object, the LiDAR data including respective point cloud representations of the target object and the environment in various sampling instances;

(ii) as the mobile robot traverses the environment, iteratively updating, by the pose data update module, pose data representing an estimated pose of the mobile robot with respect to a known reference location of the target object in corresponding sampling instances;

(iii) extracting, by the localization controller, a subset of LiDAR data points in the point cloud representation of a previous sampling instance, the subset of LiDAR data points corresponding only to features of the target object in the initial map based on the estimated pose of the mobile robot associated with the previous sampling instance, the subset of LiDAR data points excluding information that corresponds to other objects in the environment;

(iv) obtaining, by the localization controller, desired LiDAR data points in the point cloud representation in a current sampling instance, the desired LiDAR data points including current LiDAR data points which correspond to the extracted subset of LiDAR data points in the previous sampling instance, the desired LiDAR data points excluding information that corresponds to other objects in the environment;

(v) filtering, by the localization controller, the desired LiDAR data points based on a probability of retaining each desired LiDAR data point to generate filtered desired LiDAR data points, the retaining probability being directly proportional to respective distances of the LiDAR device to the desired LiDAR data points, wherein the retaining probability equals 1 when the distance equals a maximum distance recorded in the point cloud representation in the current sampling instance whereby the desired LiDAR data points associated with a retaining probability of 1 are retained in the filtered desired LiDAR data points;

(vi) determining, by the localization controller, a localization pose of the mobile robot with respect to the target object in the current sampling instance based on the filtered desired LiDAR data points; and (vii) controlling, by the localization controller, the motion controller to cause movement of the mobile robot in the environment based on the determined localization pose.

2. The method of claim 1, wherein (iv) further comprises:

generating an improved map having a higher density of information than the initial map;

determining correspondence between the filtered desired LiDAR data points and the improved map of the reference object to produce a confidence value of each correspondence; and obtaining the localization pose based on the confidence values.

3. The method according to claim 2, further comprising updating the pose data representing estimated pose of the mobile robot based on the confidence values.

4. The method according to claim 1, wherein updating the pose data includes using odometry data of the mobile robot.

5. The method according to claim 1, further including random filtering the filtered desired LiDAR data points to produce a reduced number of data points as the filtered desired LiDAR data points.

6. The method according to claim 1, further comprising repeating (ii) to (v) in the next sampling instance.

7. A method according to claim 1, wherein the reference object for creating the initial map is not exactly the same as the target object.

8. A non-transitory computer readable medium storing instructions which, when executed by a processor, cause the processor to perform the method of claim 1.

9. A system for localizing a mobile robot with respect to a target object using an initial map of a reference object which is a representation of the target object, the system comprising (i) a LiDAR device mounted to the mobile robot and arranged to capture LiDAR data of the target object when the mobile robot is arranged to traverse in an environment associated with the target object; the LiDAR data including respective point cloud representations of the target object and the environment in various sampling instances;

(ii) a pose data update module arranged to iteratively update pose data representing estimated pose of the mobile robot with respect to a known reference location of the target object in corresponding sampling instances when the mobile robot is arranged to traverse the environment;

(iii) a motion controller configured to control movement of the mobile robot;

(iv) a localization controller communicatively coupled to the LiDAR device, the pose data update module and the motion controller, the localization controller configured to:

a. extract a subset of LiDAR data points in the point cloud representation of a previous sampling instance, the subset of LiDAR data points corresponding only to features of the target object in the initial map based on the estimated pose of the mobile robot associated with the previous sampling instance, wherein the subset of LiDAR data points excludes information that corresponds to other objects in the environment;

b. obtain desired LiDAR data points in the point cloud representation in a current sampling instance, the desired LiDAR data points including current LiDAR data points which correspond to the extracted subset of LiDAR data points in the previous sampling instance, wherein the desired LiDAR data points excludes information that corresponds to other objects in the environment;

c. filter the desired LiDAR data points based on a probability of retaining each desired LiDAR data point to generate filtered desired LiDAR data points, the retaining probability being directly proportional to respective distances of the LiDAR device to the desired LiDAR data points, wherein the retaining probability equals 1 when the distance equals a maximum distance recorded in the point cloud representation in the current sampling instance whereby the desired LiDAR data points associated with a retaining probability of 1 are retained in the filtered desired LiDAR data points;

d. determine a localization pose of the mobile robot with respect to the target object in the current sampling instance based on the filtered desired LiDAR data points, and e. control the motion controller to cause movement of the mobile robot in the environment based on the determined localization pose of the mobile robot.

10. The system according to claim 9, wherein the localization controller is further configured to: generate an improved map having a higher density of information than the initial map; determine correspondence between the filtered desired LiDAR data points and the improved map of the reference object to produce a confidence value of each correspondence; and obtain the localization pose based on the confidence values.

11. The system according to claim 10, wherein the localization controller is further configured to update the pose data representing estimated pose of the mobile robot based on the confidence values.

12. The system according to claim 9, further comprising an odometer, and wherein updating the pose data includes using odometry data of the mobile robot.

13. The system according to claim 9, further comprising a random filter to filter the filtered desired LiDAR data points to produce a reduced number of data points as the filtered desired LiDAR data points.

14. The system according to claim 9, wherein the reference object for creating the initial map is not exactly the same as the target object.

15. A mobile robot comprising the system of claim 9.

* * * * *